(12) United States Patent
Kania et al.

(10) Patent No.: US 8,287,728 B2
(45) Date of Patent: Oct. 16, 2012

(54) ELEVATED SWALE FOR TREATMENT OF CONTAMINATED STORMWATER

(75) Inventors: Bruce G. Kania, Shepherd, MT (US);
Frank M. Stewart, Bozeman, MT (US);
David Brian Kroll, Stockton, CA (US)

(73) Assignee: Fountainhead L.L.C., Shepherd, CT (US)

( * ) Notice: Subject to any disclaimer, the term of this patent is extended or adjusted under 35 U.S.C. 154(b) by 212 days.

(21) Appl. No.: 12/693,468

(22) Filed: Jan. 26, 2010

(65) Prior Publication Data

US 2010/0200480 A1    Aug. 12, 2010

Related U.S. Application Data

(60) Provisional application No. 61/151,238, filed on Feb. 10, 2009.

(51) Int. Cl.
*C02F 3/06* (2006.01)
*C02F 3/32* (2006.01)

(52) U.S. Cl. .......... 210/150; 210/162; 210/170.03; 210/602; 405/39; 405/45; 405/50

(58) Field of Classification Search .......... 210/150, 210/151, 162, 170.01, 170.03, 170.07, 602, 210/747.1, 747.2, 747.3, 747.7; 405/36, 405/39, 43, 45, 46, 50
See application file for complete search history.

(56) References Cited

U.S. PATENT DOCUMENTS

| | | | |
|---|---|---|---|
| 3,770,623 A | 11/1973 | Seidel | |
| 4,415,450 A | 11/1983 | Wolverton | |
| 4,462,713 A * | 7/1984 | Zurcher et al. | 405/36 |
| 4,839,051 A | 6/1989 | Higa | |
| 4,855,040 A | 8/1989 | Kickuth | |
| 4,995,969 A | 2/1991 | LaVigne | |
| 5,073,257 A | 12/1991 | Higa | |
| 5,269,094 A | 12/1993 | Wolverton et al. | |
| 5,273,653 A | 12/1993 | Kickuth | |
| 5,281,332 A | 1/1994 | Vandervelde et al. | |
| 5,322,629 A | 6/1994 | Stewart | |
| 5,342,144 A * | 8/1994 | McCarthy | 405/39 |
| 5,437,786 A | 8/1995 | Horsley et al. | |
| 5,486,291 A | 1/1996 | Todd et al. | |
| 5,549,817 A | 8/1996 | Horsley et al. | |
| 5,595,458 A * | 1/1997 | Grabhorn | 210/170.03 |
| 5,595,652 A | 1/1997 | Rainer | |
| 5,622,448 A | 4/1997 | Baum et al. | |
| 5,632,896 A | 5/1997 | Vandervelde et al. | |
| 5,637,218 A | 6/1997 | Kickuth | |
| 5,702,593 A | 12/1997 | Horsley et al. | |
| 5,733,453 A | 3/1998 | DeBusk | |
| 5,788,849 A | 8/1998 | Hutter, Jr. et al. | |
| 5,921,709 A | 7/1999 | Baum et al. | |
| 6,277,274 B1 | 8/2001 | Coffman | |
| 6,409,427 B1 | 6/2002 | Maxwell, III | |
| 6,569,321 B2 | 5/2003 | Coffman | |
| 6,592,761 B2 | 7/2003 | Wofford | |
| 6,712,969 B2 * | 3/2004 | Madrid | 210/602 |

(Continued)

*Primary Examiner* — Christopher Upton
(74) *Attorney, Agent, or Firm* — Antoinette M. Tease

(57) ABSTRACT

An elevated swale comprising a porous and water-permeable interior zone, a permeable and compressible exterior shell, and vertically oriented cylindrical inserts. The exterior shell surrounds the interior zone, and the cylindrical inserts are placed within cylindrical cavities that are cut vertically into the interior zone. In an alternate embodiment, the present invention is an elevated swale comprising stacked layers of polymer matting and vertically oriented cylindrical inserts. The cylindrical inserts are placed within cylindrical cavities that are cut vertically into the stacked layers of polymer matting.

41 Claims, 12 Drawing Sheets

U.S. PATENT DOCUMENTS

| | | |
|---|---|---|
| 6,821,427 B2 * | 11/2004 | Macpherson et al. ........ 210/602 |
| 6,858,142 B2 | 2/2005 | Towndrow |
| 6,905,599 B2 | 6/2005 | Allard |
| 7,080,480 B2 | 7/2006 | Urban et al. |
| 7,087,161 B1 | 8/2006 | Nishibori et al. |
| 7,105,084 B1 | 9/2006 | Hilton, Jr. et al. |
| 7,320,752 B2 | 1/2008 | Austin et al. |
| 7,378,021 B2 | 5/2008 | Austin et al. |
| 7,381,333 B1 | 6/2008 | Rainer |
| 7,425,262 B1 | 9/2008 | Kent |
| 2005/0109707 A1 | 5/2005 | Bryant |
| 2008/0069642 A1 | 3/2008 | Ayers et al. |
| 2008/0142438 A1 | 6/2008 | Kent |
| 2008/0197073 A1 | 8/2008 | Jacquet |
| 2008/0251448 A1 | 10/2008 | Kent |
| 2009/0045145 A1 * | 2/2009 | Kent ........................ 210/170.03 |
| 2009/0290936 A1 * | 11/2009 | Underwood .................... 405/39 |

* cited by examiner

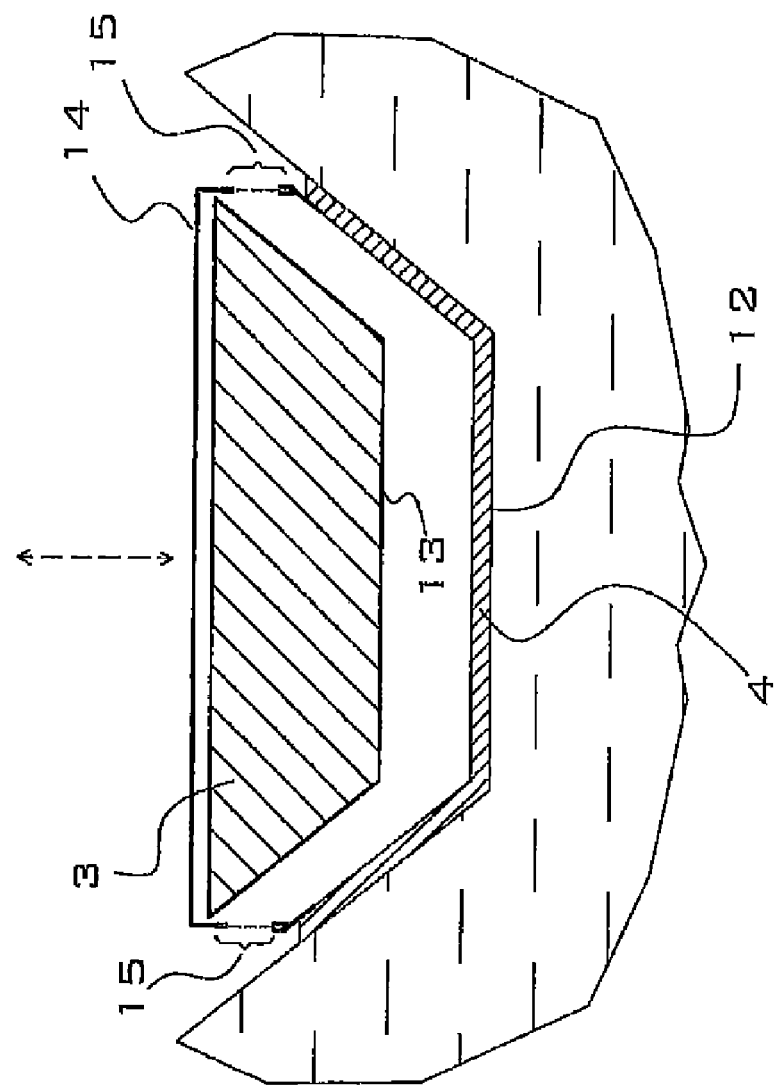

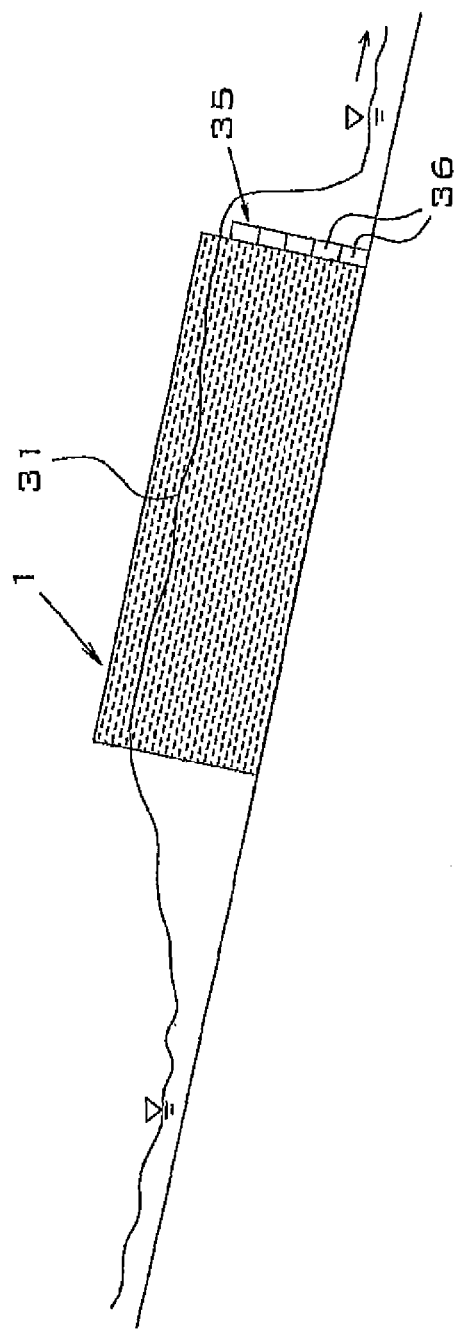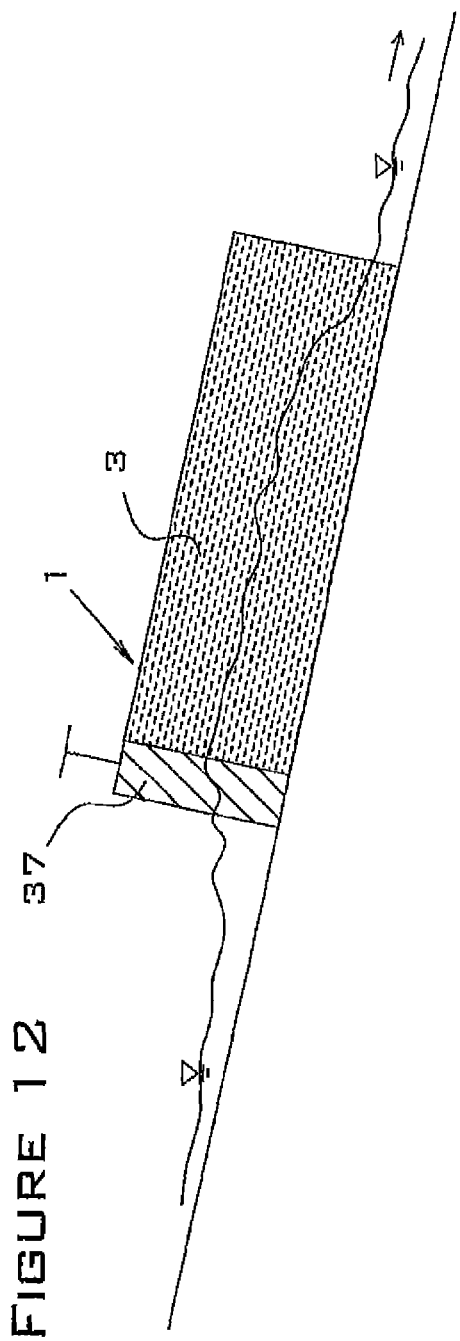

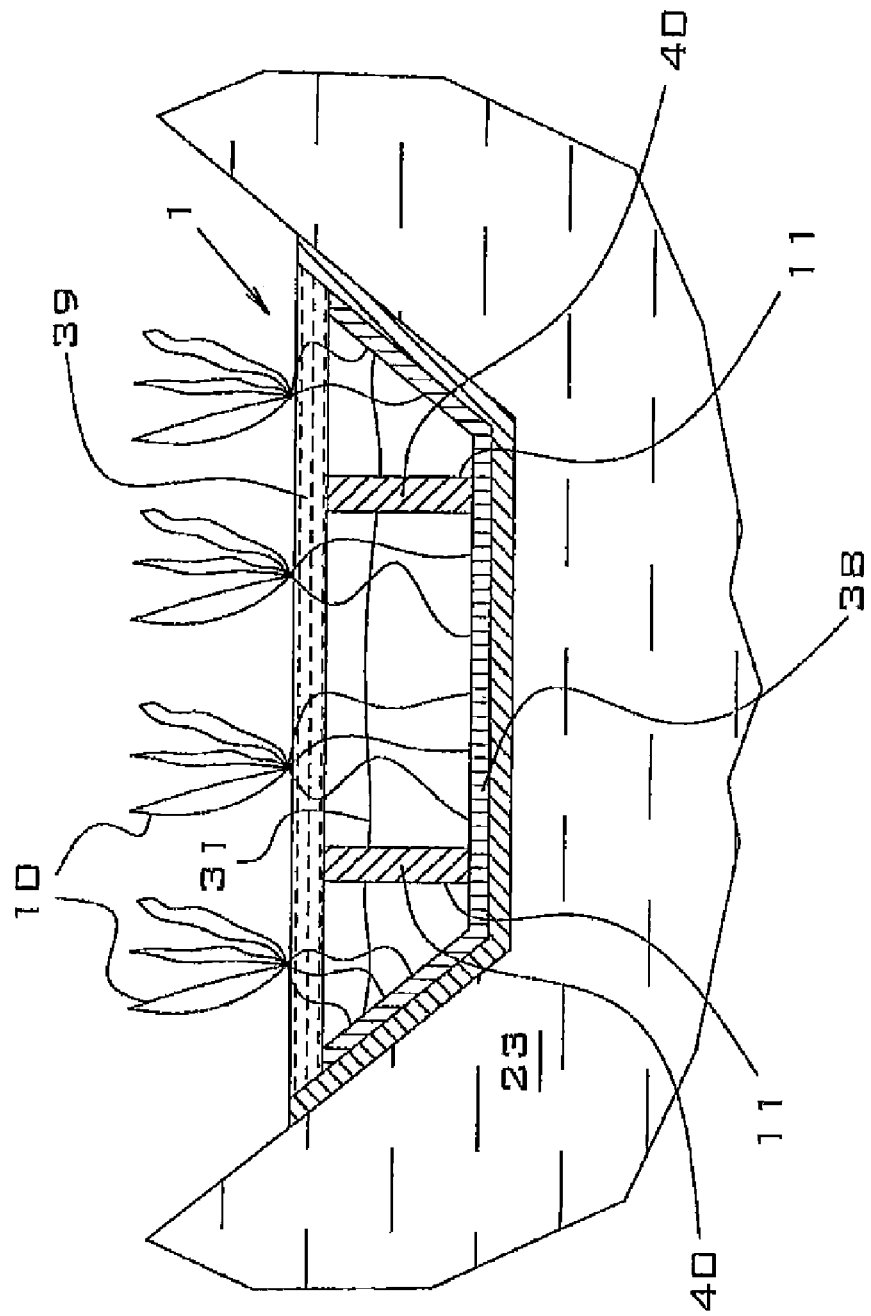

ELEVATED SWALE FOR TREATMENT OF CONTAMINATED STORMWATER

CROSS-REFERENCE TO RELATED APPLICATION

This application claims priority under 35 U.S.C. §119(e) back to U.S. Patent Application No. 61/151,238 filed on Feb. 10, 2009.

BACKGROUND OF THE INVENTION

1. Field of the Invention

The present invention relates generally to the field of water treatment, and more specifically, to an elevated swale for the treatment of contaminated stormwater.

2. Description of the Related Art

Contaminated surface runoff from stormwater events is a major potential cause of water pollution in urban, residential and agricultural settings around the world. During and after rainstorms and snowstorms, storm runoff picks up a wide variety of contaminants as it flows across the surface and then into private and public waters. Runoff that flows across roads and parking lots picks up oil, grease and metals from automobile discharges; it picks up nitrate and phosphate from fertilized lawns and golf courses; it picks up organic waste, herbicides and pesticides from agricultural sites; and it picks up grit and colloidal particles from all of these locations. These contaminants have the potential to pollute receiving waters such as streams, rivers and lakes unless the runoff is treated prior to entering the receiving waters. In order to control stormwater pollution, public authorities must provide methods for intercepting and treating these contaminated flows.

Stormwater can be treated by a variety of methods, including detention ponds, constructed wetlands, infiltration basins, constructed filters, and open-channel swales. Treatment typically requires a combination of mechanical filtration (or settling) in combination with biological treatment. In general, mechanical filtration/settling removes the suspended particles, while biological treatment removes the nutrients and organic materials. (The removal of nutrients and other contaminants by bacteria and plants is commonly called "biological filtration").

Extensive research, experimentation and monitoring have been done in the U.S. within the past decade to evaluate and improve the various methods of stormwater treatment. One method that has shown excellent efficacy is the "treatment swale." According to the Center for Watershed Protection, the term swale refers to a "vegetated, open channel management practice designed specifically to treat and attenuate stormwater runoff for a specified water quality volume." Conventional treatment swales can be either "wet" (in which contaminated water flows above ground surface over and through vegetation growing in the swale) or "dry" (in which contaminated water flows below ground surface through a permeable blend of sand, fine soil particles, and/or organic matter). In both the wet and dry swale structures, solid particles are mechanically filtered out, while nutrients and organics are biologically treated by beneficial, naturally occurring bacteria that colonize the surfaces of the vegetation and soil particles and break down the undesirable nutrients (such as ammonium and phosphate) and organics (such as manure and plant detritus) during their normal metabolic activity. For example, certain bacteria use ammonium as an energy source, and convert it to nitrite and then nitrate during the energy-extraction process. Other bacteria convert nitrate to harmless nitrogen gas, which then vents to the atmosphere. These same bacteria uptake phosphate and incorporate it into cellular biomass during the nitrogen conversion processes. In addition, the bacteria form sticky biofilms that tend to attract and trap particulate contaminants, such as metals that are bound to colloidal particles.

There are numerous examples in the prior art of "treatment in a box" types of remediation systems, wherein polluted water is passed through porous and permeable treatment media that are encapsulated within various types of containers. Examples of these types of systems are disclosed in Vandervelde et al. (U.S. Pat. No. 5,281,332), Towndrow (U.S. Pat. No. 6,858,142) and Kent (U.S. Patent Application Pub. No. 2008/0251448). In these and other similar examples of prior art, the containment systems are comprised of rigid exterior walls and are not designed to be fitted into channels. There is one example in the prior art (Rainer, U.S. Pat. No. 5,595,652) of a treatment structure that is designed to snugly fit into a pipe, thereby preventing by-pass of water around the structure. This device is a simple tubular container filled with pieces of sponge that expand when exposed to water. Although this device may be suitable for use in enclosed pipes of circular cross section, it is not readily adaptable for use in open channels of non-circular cross section, particularly if the channel surface is irregular. For example, the expansion of this device would tend to cause the device to "pop out" of a trapezoidal channel as the device expanded because it comprises no means of attaching the device to the channel walls.

Although conventional wet and dry treatment swales are both useful for the treatment of contaminated stormwater, each has numerous drawbacks. For example, wet swales are poorly accepted in residential settings due to the nuisance surface flows that promote noxious pests such as mosquitoes and may produce drowning hazards for children, while dry swales have the disadvantage of requiring relatively disruptive and expensive earth work. The present invention incorporates the advantages and eliminates the disadvantages of each of these prior art swale systems, while also incorporating several desirable new features that are not present in either type of existing conventional swale.

BRIEF SUMMARY OF THE INVENTION

The present invention is an elevated swale comprising: a porous and water-permeable interior zone; a permeable and compressible exterior shell; and vertically oriented cylindrical inserts; wherein the exterior shell surrounds the interior zone; and wherein the cylindrical inserts are placed within cylindrical cavities that are cut vertically into the interior zone. In a preferred embodiment, plants are grown within the cylindrical inserts. Preferably, the cylindrical inserts comprise bedding soil and/or soil-less growth medium.

In a preferred embodiment, the interior zone is colonized by microbial biofilms. In one embodiment, the interior zone is comprised of pieces of nonwoven polymer matting that have been compressed into a semi-rigid permeable block. Preferably, the nonwoven polymer matting is biological filter medium comprised of recycled polyethylene terephthalate fibers that are intertwined. In a preferred embodiment, the fibers have a mass-to-length ratio in the range of about 50 denier to about 300 denier, and the fibers are reinforced with an adhesive binder.

In an alternate embodiment, the interior zone is comprised of loose polymer fibers that have been compressed into a semi-rigid permeable block. Preferably, the fibers are recycled scrap carpet fibers selected from the group consisting of polypropylene fibers, polyethylene fibers, polyethylene terephthalate fibers, and nylon fibers.

In a preferred embodiment, the exterior shell has an uncompressed thickness of about 0.5 inch to six inches. In yet another preferred embodiment, the elevated swale has a top, bottom and sides, and the cylindrical cavities extend vertically from the top of the elevated swale to the bottom or sides of the elevated swale.

In a preferred embodiment, the exterior shell is comprised of nonwoven matting comprised of recycled polyethylene terephthalate fibers that are intertwined. Preferably, the fibers have a mass-to-length ratio in the range of about 100 denier to about 600 denier, and the fibers are reinforced with an adhesive binder.

In a preferred embodiment, the exterior shell is comprised of nonwoven polymer matting comprised of fibers having a mass-to-length ratio in the range of about 50 denier to about 99 denier. Preferably, the exterior shell is comprised of open-cell polyurethane foam sheeting.

In a preferred embodiment, the elevated swale is installed in a channel that has sides and a bottom; wherein the elevated swale has sides and a bottom; wherein the bottom of the elevated swale is in contact with the bottom of the channel, and the sides of the elevated swale are in contact with the sides of the channel; and wherein the permeable exterior shell on the bottom and sides of the elevated swale is replaced with an impermeable foam rubber sheeting.

In a preferred embodiment, the present invention further comprises a permeable polymer mesh containment bag; wherein the exterior shell comprises a top, and the top of the exterior shell is omitted; and wherein the permeable polymer mesh containment bag contains the interior zone within the exterior shell, thereby allowing the interior zone to be removed from the exterior shell for cleaning and/or replacement of the interior zone.

In a preferred embodiment, the present invention is an elevated swale comprising: stacked layers of polymer matting; and vertically oriented cylindrical inserts; wherein the cylindrical inserts are placed within cylindrical cavities that are cut vertically into the stacked layers of polymer matting. Preferably, the cylindrical inserts comprise bedding soil and/or soil-less growth medium. In one embodiment, each layer of polymer matting is nonwoven polymer matting that is roughly two inches thick. In an alternate embodiment, each layer of polymer matting comprises recycled scrap carpet materials that are formed into blankets of nonwoven matting.

In one embodiment, the layers of matting are bound together by an adhesive. In an alternate embodiment, the layers of matting are bound together by stitching. In yet another embodiment, the layers of matting are bound together by pinning.

In a preferred embodiment, the present invention further comprises anchoring spikes that are passed through the cylindrical cavities in lieu of the cylindrical inserts and driven into ground subsurface, thereby anchoring the elevated swale.

The present invention optionally comprises an underflow gate that is attached to the downstream face of the elevated swale. In an alternate embodiment, the present invention alternately comprises a weir that is attached to the downstream face of the elevated swale. In yet another alternate embodiment, the present invention comprises a prefilter screen that is attached to the upstream face of the elevated swale.

In a preferred embodiment, the present invention further comprises a plant-resistant barrier that is located between the interior zone and the exterior shell. Preferably, the exterior shell comprises an outside surface, and a plant-resistant barrier is located on the outside surface of the exterior shell. Alternately, the plant-resistant barrier is located between any two layers of polymer matting. Alternately, the plant-resistant barrier is located on the outside surface of the stacked layers of polymer matting.

In a preferred embodiment, the present invention further comprises a top layer of plant growth medium. The present invention optionally comprises a hydrophilic wicking medium that is inserted into the cylindrical cavities in lieu of the cylindrical inserts. In an alternate embodiment, the present invention further comprises a top cover and support columns, and the support columns are installed in the cylindrical cavities in lieu of the cylindrical inserts.

In a preferred embodiment, the top cover is comprised of a material selected from the group consisting of polymer decking boards, plywood and polymer sheeting. In a preferred embodiment, the support columns are comprised of cement.

In a preferred embodiment, the cylindrical cavities are filled with a substance selected from the group consisting of soil, sand and gravel in lieu of the cylindrical inserts. Preferably, the cylindrical cavities are lined with a material that is permeable to water but impermeable to fine particles.

BRIEF DESCRIPTION OF THE DRAWINGS

FIG. 5 is a transverse cross-sectional view of a first embodiment of the present invention with an optional removable interior section.

FIG. 11 is a longitudinal cross-sectional view of the present invention with an optional weir.

FIG. 12 is a longitudinal cross-sectional view of the present invention with an optional prefilter screen.

FIG. 13 is a transverse cross-sectional view of the present invention with an optional plant-resistant barrier layer and an optional layer of plant-growth medium.

REFERENCE NUMBERS

Figure 1:
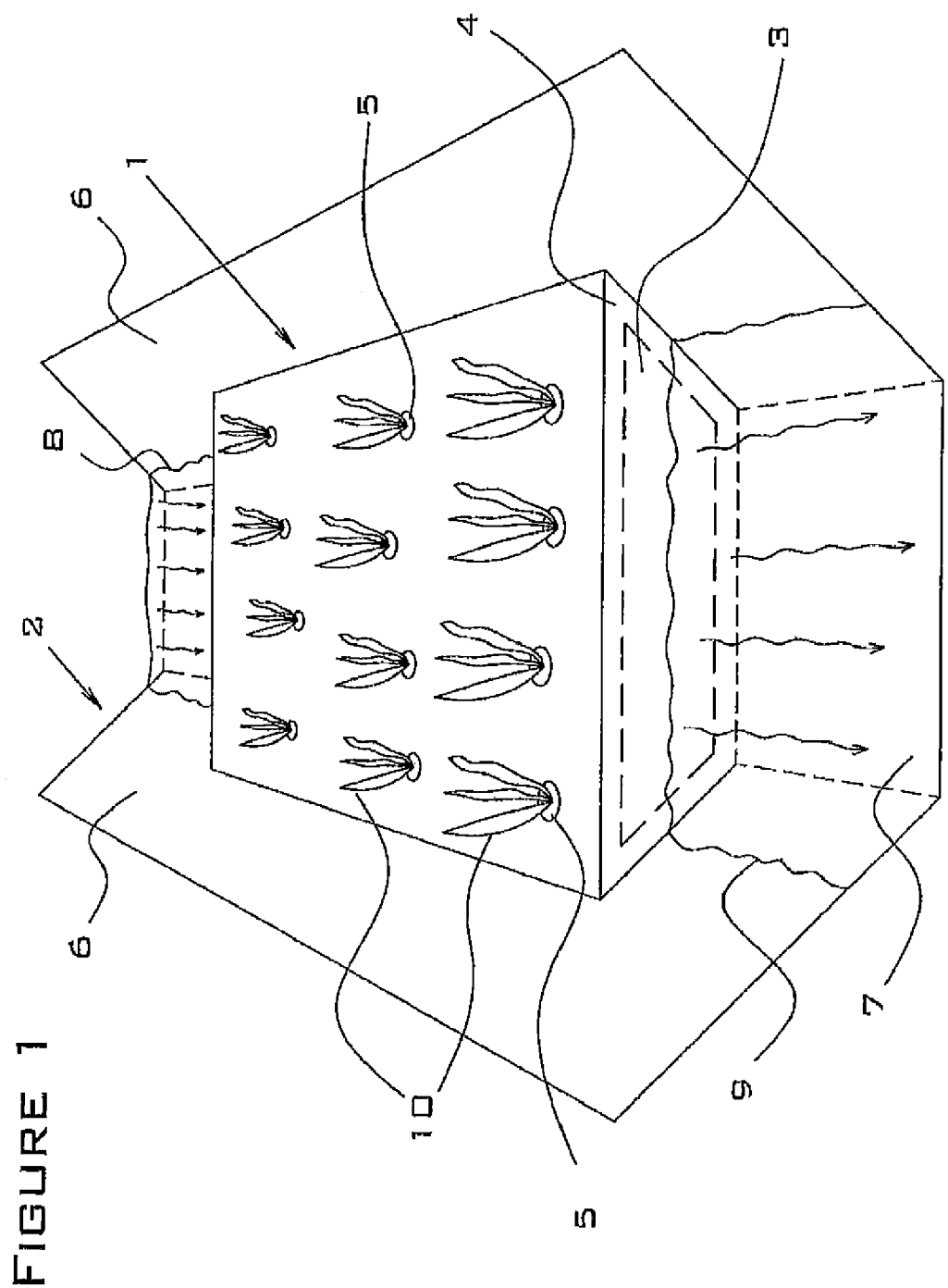
FIG. 1 is a perspective view of the present invention installed in a prismatic channel.

1 Elevated swale
2 Prismatic channel

3 Interior zone/interior section
4 Exterior shell
5 Cylindrical insert
6 Channel side
7 Channel bottom
8 Untreated stormwater
9 Treated stormwater
10 Plant
11 Cylindrical cavity
12 Channel surface
13 Mesh containment bag
14 Top strap
15 Buckle
16 Staple
17 Male component of buckle
18 Female component of buckle
19 Bottom strap
20 Adhesive
21 Stacked layer of permeable polymer matting
22 Anchoring spike
23 Ground subsurface surrounding a channel
24 Ammonium ion
25 Suspended solid particle
26 Polymer fiber
27 Biofilm
28 Nitrogen gas
29 Normal water elevation in channel
30 Backup water elevation upstream from elevated swale
31 Water elevation within elevated swale
32 Water elevation downstream from elevated swale
33 Underflow gate
34 Exit opening
35 Weir
36 Stop log
37 Prefilter screen
38 Plant-resistant barrier layer
39 Growth medium
40 Hydroponic wicking material
41 Support column
42 Top cover

DETAILED DESCRIPTION OF INVENTION

The present invention is an elevated swale that is used to remove both dissolved and particulate contaminants from stormwater. In a first embodiment, the present invention comprises a compressible outer shell, a porous and water-permeable interior water treatment section, and a plurality of cylindrical, vertically oriented inserts. The invention is placed within a ditch or stream so that runoff water flows through the interior water treatment section (also referred to herein as the "interior section" or "interior zone"), where contaminants are removed by mechanical and biological processes. The permeable interior section is comprised of nonwoven polymer fibers that are intertwined and/or compressed to form a three-dimensional block. The nonwoven fibers are selected to promote colonization by beneficial microbial biofilms and also to provide mechanical filtration of solids from the water. When contaminated stormwater flows through the invention, nutrients and organics are removed by microbial bioremediation, and solids are simultaneously trapped by the closely-spaced fibers. Because water normally flows through the interior of the invention (but not over the top), nuisance surface flows are eliminated. Furthermore, because the invention is placed within the existing channel section, extensive excavation and soil replacement are not required. Two preferred embodiments of the present invention, together with variations thereof, are discussed more fully below.

FIG. 1 is a perspective view of the first embodiment. In this figure, the elevated swale 1 has been installed in a prismatic channel 2 (a prismatic channel is a channel having an unvarying cross-section and constant bottom slope). The elevated swale 1 comprises a porous and water-permeable interior zone 3, a permeable and compressible exterior shell 4, and cylindrical and vertically oriented inserts 5 The prismatic channel 2 is comprised of sides 6 and bottom 7. Untreated stormwater 8 flows into and through the elevated swale 1, and treated stormwater 9 flows out of the elevated swale 1. Cylindrical inserts 5 are placed within cylindrical cavities (not shown) that are cut vertically into the interior zone 3. Optional plants 10 are shown growing within cylindrical inserts 5 on the elevated swale 1. To enhance plant growth, the cylindrical inserts 5 may comprise bedding soil or soil-less growth medium.

During periods of low to moderately high flows, the present invention is constructed so that all of the water flows through the interior of the elevated swale 1, with the water surface below the top surface of the elevated swale, as shown in FIG. 1. During periods of very high flow due to large storm events, water levels may flow over the top of the elevated swale. The elevated swale will not be damaged by these overtopping flows.

Figure 2:
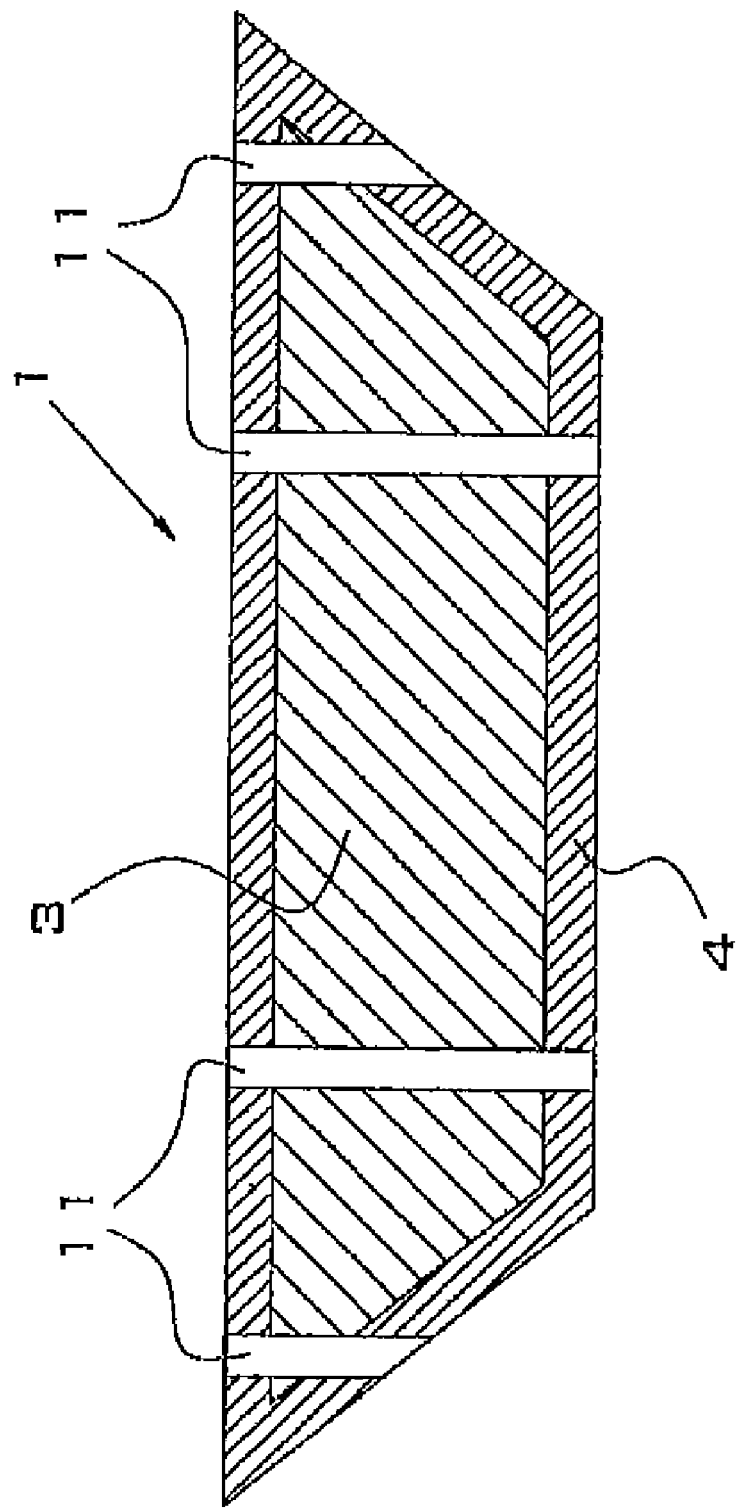
FIG. 2 is a transverse cross-sectional schematic view of a first embodiment of the present invention prior to installation in a channel.

FIG. 2 is a transverse cross-sectional schematic view of the first embodiment of the present invention shown in FIG. 1 prior to planting and installation in a prismatic channel. As shown, the elevated swale 1 is comprised of an interior zone 3, an exterior shell 4, and a plurality of vertically oriented cylindrical cavities 11. The cylindrical inserts 5 (not shown) fit into the cylindrical cavities 11.

The interior zone 3 is comprised of a porous and water-permeable material that is suitable for colonization by microbial biofilms. The interior zone 3 may be comprised of either pieces of nonwoven polymer matting that have been compressed into a semi-rigid permeable block or loose polymer fibers that have been compressed into a semi-rigid permeable block. An example of a suitable nonwoven polymer matting is biological filter medium comprised of recycled polyethylene terephthalate (PET a/k/a polyester) fibers, preferably having a mass/length ratio ranging from about 50 to 300 denier, that are intertwined and optionally reinforced with an adhesive binder. The purpose of the binder is to add mechanical strength and stiffness to the matting. The binder may be applied during the manufacturing process by spraying uncured adhesive onto the intertwined fibers and then baking the binder onto the fibers in an oven. The adhesive binder may be comprised of latex. The resulting matting is typically produced in continuous rolls having a thickness of up to about two (2) inches. An example of this type of material is biological filter medium (part Number FM56JCIIBLK), which is a two-inch thick nonwoven polyester matting produced by Americo Manufacturing Company of Acworth, Ga. The matting may be cut into pieces of suitable size (for example, 4 inches×4 inches×2 inches). Alternately, randomly sized scrap pieces of this matting material may be recycled from other manufacturing operations and used as pieces of interior fill material. Multiple pieces of new or scrap matting may be placed within the exterior shell 4 and then compressed sufficiently to eliminate void spaces between the pieces of matting.

Examples of loose polymer fibers that may comprise the interior zone 3 are recycled scrap carpet fibers made from polypropylene (PP), polyethylene (PE), PET or nylon (or a combination of these materials) that are inserted inside the exterior shell 4 and then mechanically compressed to a degree of compaction that produces the desired density and permeability of the interior zone 3.

The interior zone 3, whether comprised of compacted pieces of nonwoven polymer matting or compressed individual fibers, is highly permeable to water (e.g., having a hydraulic conductivity in the range of 0.001 meters per second to 10.0 meters per second). The interior zone 3 also has the ability to mechanically trap (i.e., filter out) suspended particles of a predetermined size range. For example, in some applications, it may be desirable to trap large pieces of organic debris such as leaf fragments, while simultaneously passing smaller particles such as silt and clay particles. In other applications, it may be desirable to trap all particles down to the diameter of silt particles. The mechanical filtration characteristics of the interior zone 3 are preferably selected in order to selectively filter particles of a desired size range.

In addition to providing mechanical filtration, the synthetic fibers comprising the interior zone 3 serve as the colonizing surface for beneficial bacteria that form sticky biofilm coatings around the individual fibers. These biofilms extract undesirable nutrients from the water passing through the interior zone 3, while the pore space between the biofilm-coated fibers provides permeability for continued passage of stormwater through the interior zone 3 via gravity-driven flow. Most common polymeric fibers—including PET, PP, PE and nylon—have been shown to be suitable for growing beneficial bacterial biofilms. Additional details of the mechanical and biological filtration processes are described in connection with FIG. 8.

The exterior shell 4 provides the required structural integrity for the elevated swale 1. The exterior shell 4 is comprised of a flexible and compressible material having suitable mechanical strength to form a durable enclosure around the interior zone 3. The exterior shell 4 is water-permeable and forms an exterior layer around the top, sides, front, back, and bottom of the elevated swale 1. The exterior shell has an uncompressed thickness of about 0.5 inch to six inches. The thickness, flexibility, and compressibility of the exterior shell 4 are selected so that the elevated swale 1 forms a snug fit in the channel 2 for any specific application. Additional details for the exterior layer 4 are provided below in connection with the descriptions of FIGS. 3 and 4.

The cylindrical cavities 11 extend vertically from the top to the bottom or sides of the elevated swale 1. One use for the cylindrical cavities 11 (growing plants) was described in connection with FIG. 1. Additional uses for other configurations of the cylindrical cavities 11 are discussed in connection with FIGS. 6, 13 and 14.

Figure 3:
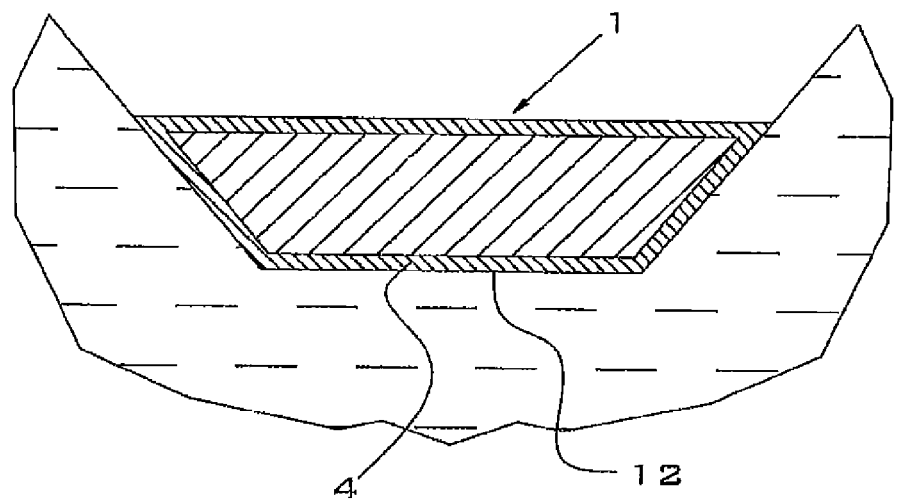
FIG. 3 is a transverse cross-sectional view of a first embodiment of the present invention with a relatively thin exterior shell.
Figure 4:
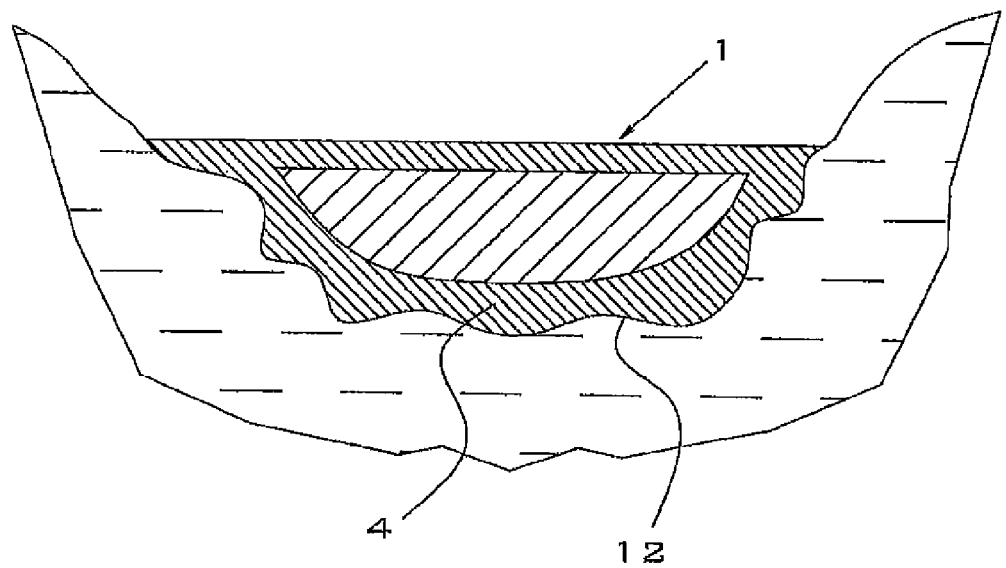
FIG. 4 is a transverse cross-sectional view of a first embodiment of the present invention with a relatively thick exterior shell.

FIGS. 3 and 4 are transverse cross-sectional illustrations showing two variations of the exterior shell 4. FIG. 3 illustrates the installation of an elevated swale 1 into a channel having a surface 12 that is relatively smooth and free from irregularities such as protrusions and indentations. This type of channel is representative of structures such as concrete-lined channels and ditches that are mechanically excavated into well compacted, fine-grained homogeneous soils. For this type of installation, the exterior layer 4 may be relatively thin (for example, from 0.5 inch to two inches thick), as shown in the drawing.

An acceptable material for the exterior shell 4 for the type of installation shown in FIG. 3 is nonwoven matting comprised of recycled polyethylene terephthalate (PET a/k/a polyester) fibers, said fibers preferably having a mass/length ratio ranging from about 100 to 600 denier, that are intertwined and optionally reinforced with an adhesive binder. The purpose of the binder is to add mechanical strength and stiffness to the matting. The binder may be applied during the manufacturing process by spraying uncured adhesive onto the intertwined fibers and then baking the binder onto the fibers in an oven. The adhesive binder may be comprised of latex. The resulting matting may be produced in continuous rolls having thicknesses ranging from about 0.5 inch to two inches. An example of this type of material is biological filter medium (part Number FM56JCIIBLK), which is a two-inch thick nonwoven polyester matting produced by Americo Manufacturing Company of Acworth, Ga.

FIG. 4 illustrates the installation of an elevated swale 1 into a channel having a surface 12 that is relatively rough and irregular. For this type of installation, the exterior shell 4 must be relatively thick (for example, three inches to six inches thick) and compressible in order to eliminate gaps between the channel surface 12 and the elevated swale 1. Gaps are undesirable because they provide a flow path for untreated stormwater to "leak" around the outside of the elevated swale and thereby bypass treatment. An acceptable material for the exterior shell 4 for this type of installation is permeable nonwoven polymer matting comprised of fibers having a denier range of 50 to 99. Nonwoven matting comprised of relatively low-denier fibers (50 to 99 denier) is generally more flexible and compressible than nonwoven matting made from relatively high-denier fibers (100 to 600 denier). The increased flexibility and compressibility of the low-denier fiber matting allows it to better conform to the irregularities present in rough channel surfaces. An example of this type of material is mechanical filter media (part Number FM56LG), which is a nonwoven polyester matting produced by Americo Manufacturing Company of Acworth, Ga. This material is more easily compressed than the biological filter material described previously (in connection with FIG. 3) and is produced in continuous rolls with an uncompressed matting thickness of about one inch. Multiple layers of this material may be bonded together with an adhesive such as hot-melt glue or other suitable means, such as sewing, to achieve thicknesses ranging from two inches to twelve inches or more.

Another acceptable material for the exterior shell 4 for the application shown in FIG. 4 is permeable, open-cell polyurethane foam sheeting having a specific gravity of about 0.05 and a 25% deflection pressure of 0.5 psi. An example of this type of material is part number 8514K32 sold by McMaster-Carr Supply Company of Santa Fe Springs, Calif.

In some applications for elevated swales involving highly contaminated stormwater, it may be desirable to prevent the stormwater from percolating through the elevated swale into the channel sides and bottom and then into the subsurface, where it may mix with natural groundwater. In these applications, portions of the permeable exterior shell that contact the channel surface 12 may optionally be replaced with impermeable materials that provide a snug seal between the elevated swale 1 and the channel surface 12, while also preventing water from passing through the elevated swale and subsequently percolating into surrounding soils. In these applications, portions of the exterior shell that do not contact the channel (i.e., the top and the inlet and outlet faces of the elevated swale) are constructed of permeable materials as described above (in connection with FIGS. 3 and 4) so that stormwater may pass through the elevated swale for treatment and conveyance. A material that is suitably flexible and compressible for forming impermeable portions of the exterior shell 4 is closed-cell ethylene-propylene-diene monomer (EPDM) foam rubber sheeting having a specific gravity of about 0.5 and a 25% deflection pressure of seven pounds per square inch (psi). An example of this type of material is part number 86005K55 sold by McMaster-Carr Supply Company of Santa Fe Springs, Calif.

FIG. 5 illustrates an optional feature of the first embodiment of the present invention, wherein the interior section 3 is readily removable from the elevated swale. The drawing shows the interior section 3 partially removed from the exterior shell 4. With this option, the interior section 3 may be either removed for cleaning of accumulated debris (for example, the interior section may be cleaned by pressure washing with a hose), or the interior section 3 may be discarded and replaced with a new interior section. With this option, the top of the exterior shell 4 is omitted, and the interior section 3 is encapsulated within a permeable polymer mesh containment bag 13. The interior section 3 may be held in position within the exterior shell 4 with top straps 14 that connect to squeeze-release buckles 15, wherein the straps and buckles are installed at intervals (for example, one strap and buckle assembly per ten linear feet) along the length of the elevated swale.

Figure 5A:
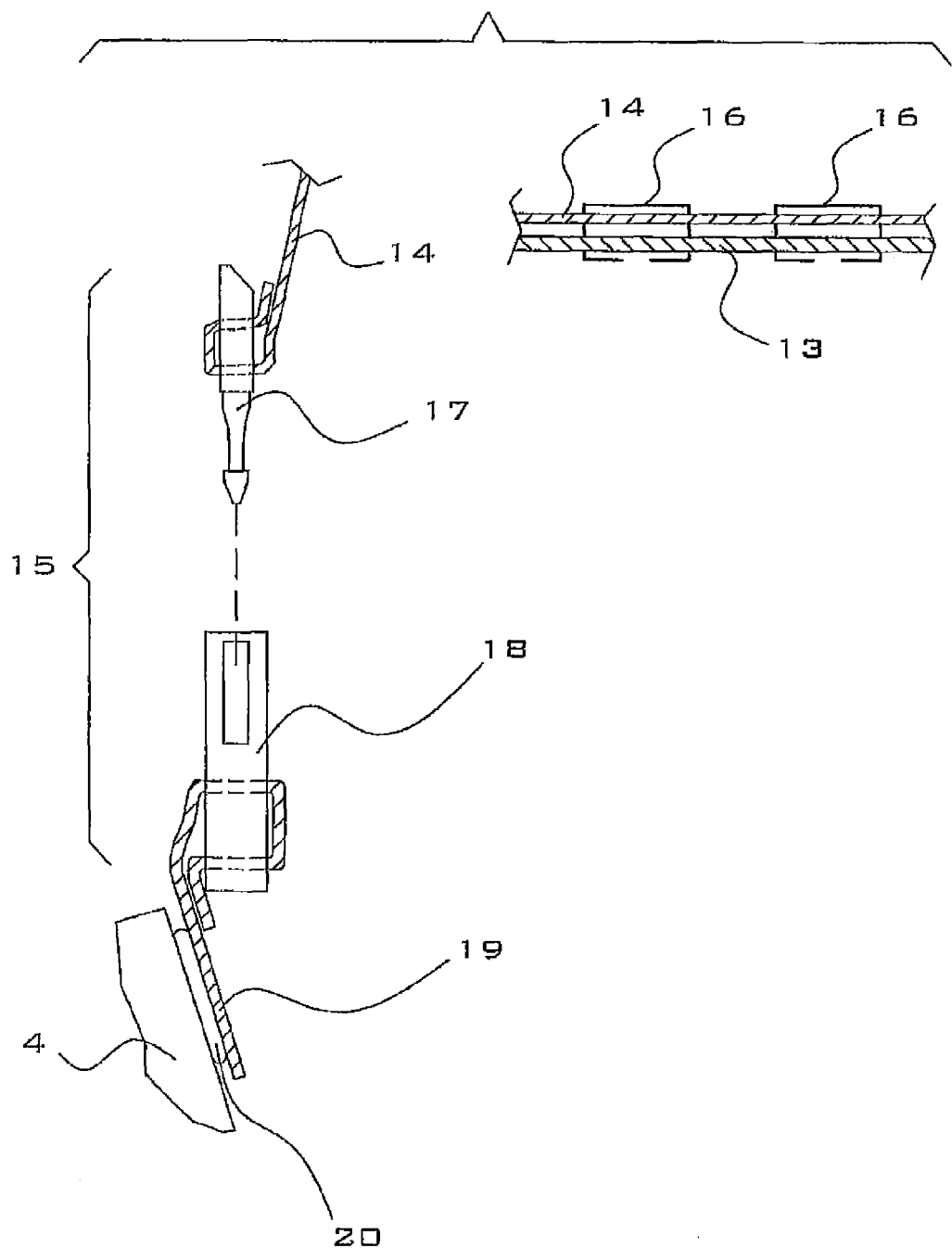
FIG. 5A is a magnified view of the strap and buckle assembly shown in FIG. 5.

FIG. 5A is a magnified view of the strap and buckle assembly shown in FIG. 5. This figure shows one particular method of holding the interior section 3 in position within the exterior shell 4, but the present invention is not limited to any particular method as long as the interior section 3 is positioned within the exterior shell 4. In this embodiment, the strap 14 is attached to the mesh containment bag 13 by means of staples 16. The squeeze release buckle 15 is a conventional polymer buckle (for example, McMaster-Carr part number 29705T17) that is comprised of a male component 17 and a female component 18 that are connected by snapping the two pieces 17 and 18 together and disconnected by squeezing the flexible tabs (not shown) of the male component 17 while pulling the two pieces 17 and 18 apart. The male component 17 of the buckle assembly is attached to the top strap 14 by looping the top strap 14 through slots in the male component 17 as shown. The female component 18 is similarly attached to a bottom strap 19 by looping the bottom strap 19 through the female buckle component 18 as shown. Top straps 14 and bottom straps 19 are preferably comprised of nylon or polypropylene webbing. The bottom strap 19 is attached to the exterior shell 4 by bonding with an adhesive 20 such as hot melt glue or polyurethane foam adhesive (for example, ENERBOND® drywall adhesive manufactured by The Dow Chemical Company of Marietta, Ga.).

Figure 6:
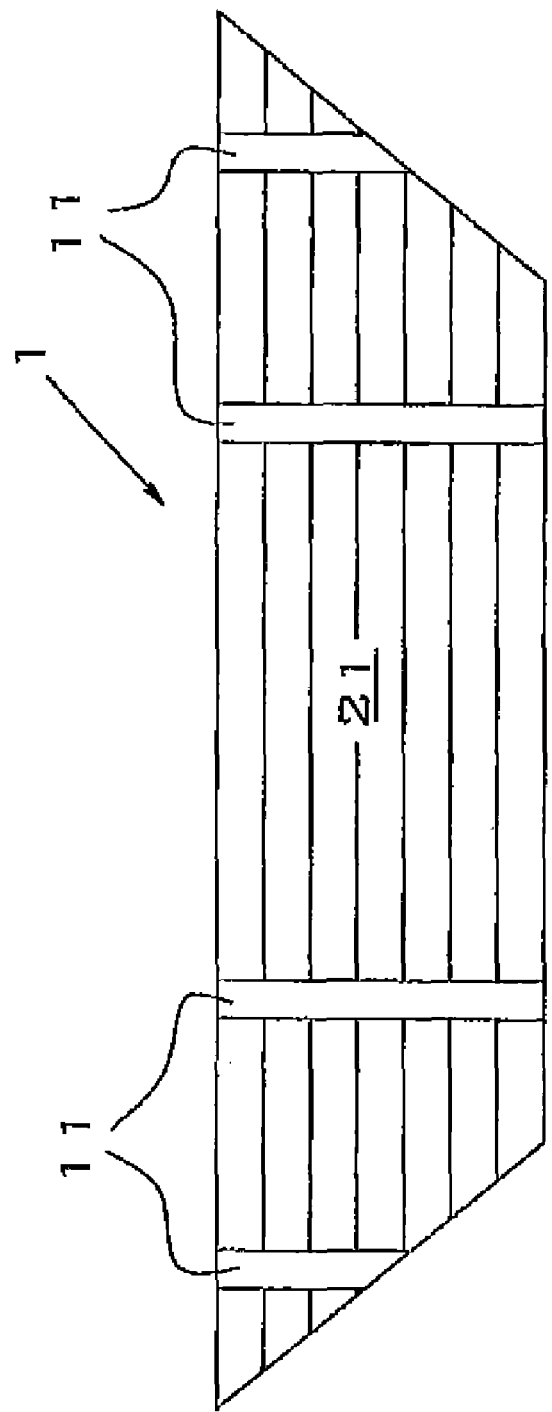
FIG. 6 is a transverse cross-sectional view of a second embodiment of the present invention.

A second embodiment of the present invention is shown in FIG. 6. In this embodiment, the interior zone 3 and the exterior shell 4 are replaced with stacked layers of permeable polymer matting 21, thereby eliminating the exterior shell 4 of the first embodiment. Also shown are cylindrical cavities 11 into which the cylindrical inserts 5 are inserted; as noted above in connection with the first embodiment, the cylindrical inserts may contain bedding soil or soil-less growth medium. This embodiment may provide more structural integrity than the first embodiment and therefore be more suitable for applications exposed to harsh conditions such as very high stormwater flows, ice scour, or heavy traffic loads.

One acceptable material for forming the stacked layers 21 is two-inch thick nonwoven polymer matting such as was previously described for use as an exterior shell 4 material. Another acceptable material for forming the stacked layers is recycled scrap carpet materials that are need into blankets of nonwoven matting. The layers of matting may be bound together by adhesives such as hot-melt glue, polyurethane, or polyurethane foam. The adhesive may be applied to the individual layers of matting during the stacking process, or alternately, the adhesive may be injected through multiple layers of matting after they are stacked. The layers may also be bound together by stitching or pinning. Manufacturing costs for the second embodiment are currently higher than manufacturing costs for the first embodiment; however, new manufacturing processes for the manufacture of scrap carpet fibers into nonwoven blankets is expected to reduce the manufacturing cost of the second embodiment in the near future.

Figure 7:
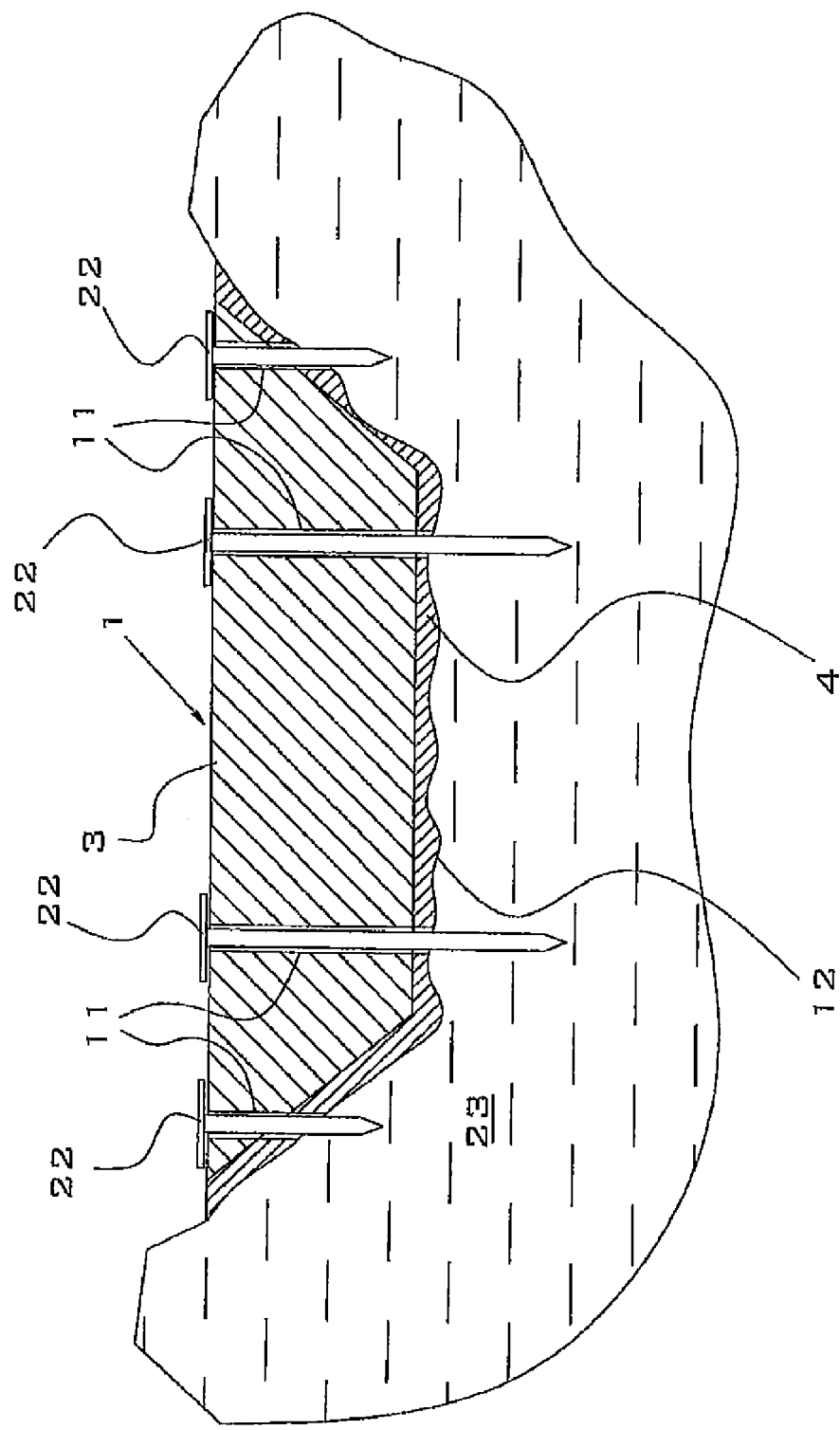
FIG. 7 is a transverse cross-sectional view of the first embodiment of the present invention after installation in a channel having an irregular bottom surface.

FIGS. 7-14 apply to both the first and second embodiments described above. FIG. 7 is a transverse cross-sectional view of the first embodiment of the present invention after installation in a channel having an irregular bottom surface. This type of channel bottom surface may commonly be present in both natural stream channels and manmade channels that are mechanically excavated into non-homogeneous or rocky soils.

As shown in FIG. 7, anchoring spikes 22 are passed through the cylindrical cavities 11 and pounded through the channel surface 12 into the ground subsurface 23, thereby anchoring the elevated swale 1 against forces due to water, ice, wind, and traffic. Additional uses for the cylindrical cavities 11 are discussed in connection with FIGS. 13 and 14.

Figure 8:
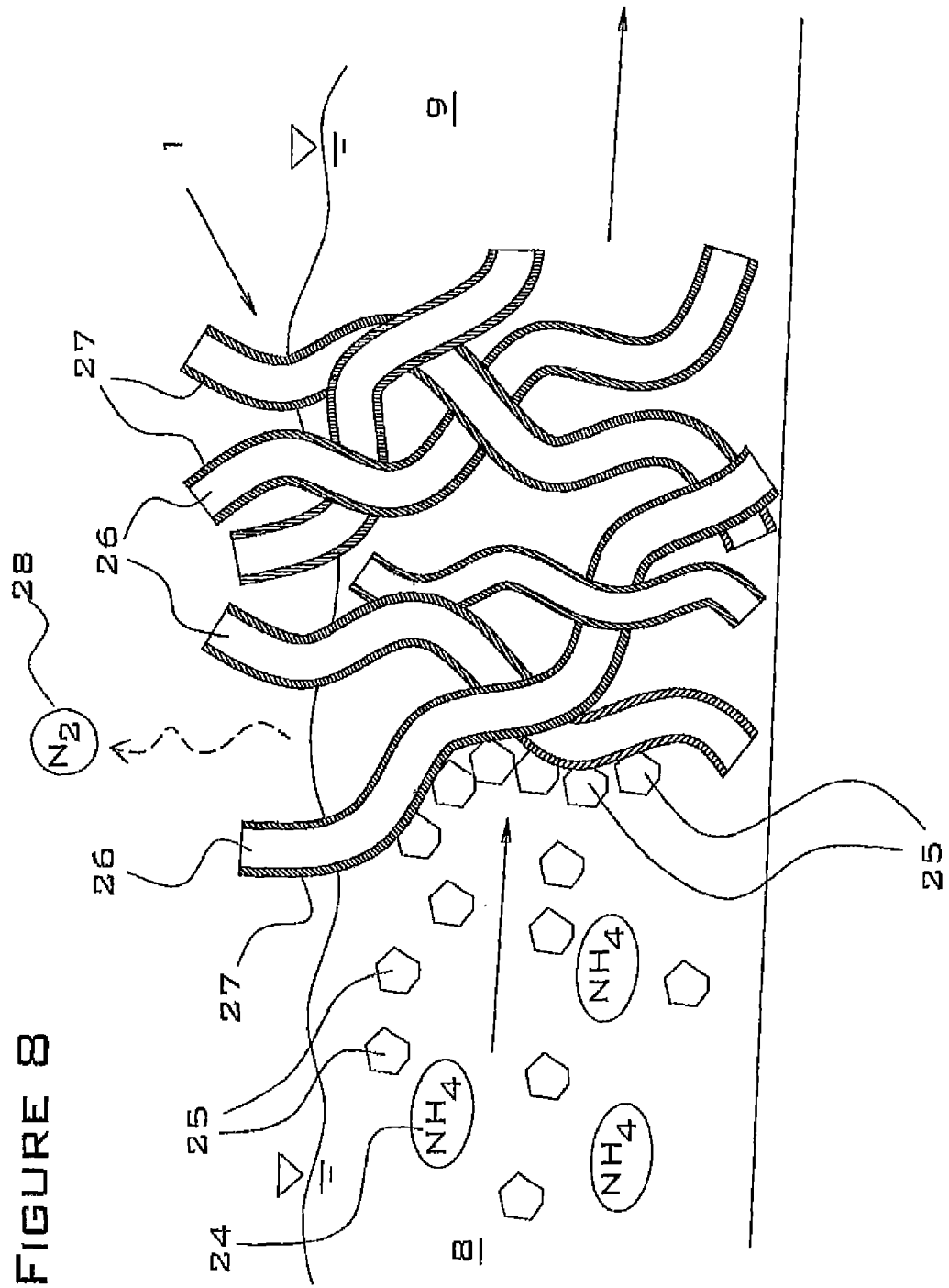
FIG. 8 is a magnified cross-sectional schematic view that illustrates the dual mechanical and biological functions that occur within the elevated swale.

FIG. 8 is a magnified cross-sectional schematic view that illustrates the dual mechanical and biological functions that occur within the elevated swale 1. As shown in this figure, the untreated stormwater 8 contains dissolved ammonium ions 24 and suspended solid particles 25. As untreated stormwater 8 flows through the elevated swale 1, solid particles 25 are trapped in the small spaces between the closely-spaced polymer fibers 26, while simultaneously, biofilms 27 that are growing on the polymer fibers 26 convert the ammonium ions 24 to harmless nitrogen gas 28 ($N_2$), which is released to the atmosphere, as illustrated by the dashed arrow. After passing through the matrix of polymer fibers 26, treated stormwater 9 exits the elevated swale 1.

Figure 9:
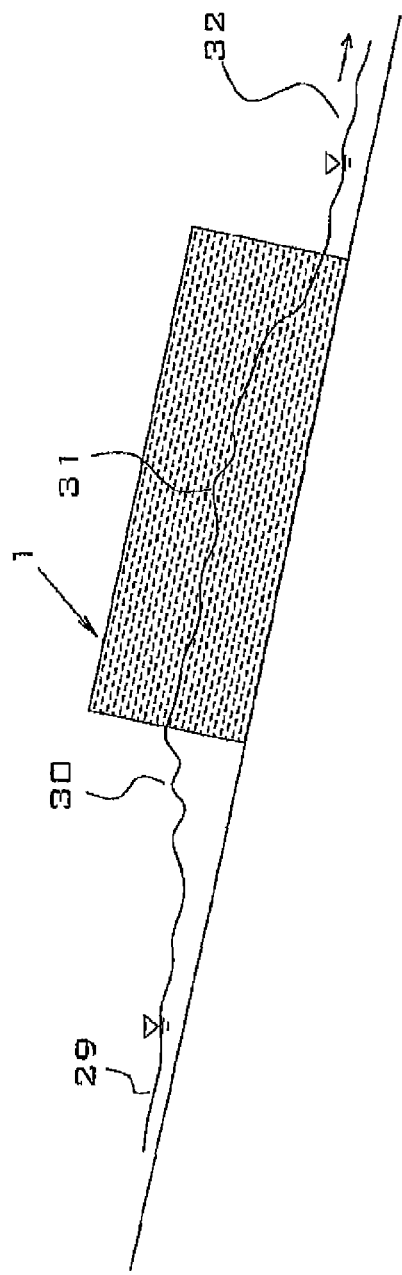
FIG. 9 is a longitudinal cross-sectional view of the present invention installed in a prismatic channel, showing representative elevations of the water surface upstream, within, and downstream from the elevated swale.

FIG. 9 is a longitudinal cross-sectional view of the present invention installed in a prismatic channel, showing the elevation of the water surface upstream, within, and downstream from an elevated swale. The elevated swale 1 is depicted with a relatively short length for illustrative purposes in this drawing, but in practice, the length of the elevated swale could extend to several hundred or several thousand feet, thereby preventing mosquitoes and other pests from accessing the water through the course of a neighborhood or town.

The presence of the elevated swale 1 produces a pooling or backwater effect directly upstream from the elevated swale 1, as shown by normal channel water elevation 29 and backed up water elevation 30. In addition, because the water flows at a lower velocity within the elevated swale 1 than it does in the open channel, the water elevation 31 within the elevated swale 1 is also elevated above normal water elevation 29. After the water exits downstream from the elevated swale 1, it drops to normal level, so that the downstream water elevation 32 is the same as normal water elevation 29.

The amount of water level rise within the elevated swale 1 is a function of the flowrate, hydraulic gradient, cross-sectional area of the elevated swale (perpendicular to flow direction), and the permeability of the materials comprising the structure. This relationship is described empirically by Darcy's Law, which can be expressed as:

$$Q = KiA$$

where Q is the flowrate, K is the hydraulic conductivity, i is the hydraulic gradient, and A is the cross-sectional flow area.

In general, it is beneficial to cause the water elevation 31 within the elevated swale 1 to rise as much as practical without overtopping the swale because the effective surface area of the elevated swale 1 that is available for mechanical and biological filtration of the water is proportional to the water elevation 31, and efficacy of contaminant removal increases with increased treatment surface area.

Figure 10:
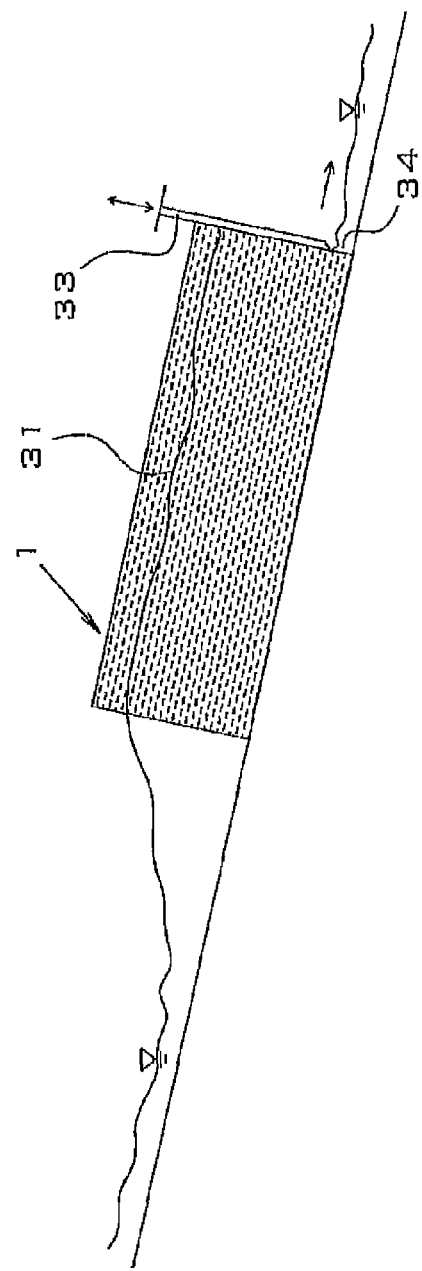
FIG. 10 is a longitudinal cross-sectional view of the present invention with an optional underflow gate.

FIG. 10 is a longitudinal cross-sectional view of the present invention with an optional underflow gate 33 attached to the downstream face of the elevated swale. The purpose of the underflow gate 33 is to allow the water elevation 31 within the elevated swale 1 to be raised as far as practical, thereby maximizing the effective treatment surface area of the elevated swale 1, which results in maximized efficacy of the structure for contaminant removal. For relatively low flow rates, the underflow gate 33 is positioned at a relatively low position, producing a relatively small exit opening 34. For larger flow rates, the gate is raised, creating a larger exit opening 34. In each case, the gate is adjusted so that the water elevation 31 is near the top surface of the elevated swale 1. The position of the underflow gate 33 may be controlled manually; optionally, if control components (not shown) are installed, the gate position may be adjusted automatically with electrical power.

FIG. 11 is a longitudinal cross-sectional view of the present invention with an optional weir 35 attached to the downstream face of the elevated swale 1. A weir is an overflow dam that raises the upstream water depth. An adjustable weir may be comprised of wooden boards, polymer plates or metal plates that are vertically stacked as shown in the figure. The primary purpose of the weir 35 is to allow the water elevation 31 within the elevated swale 1 to be raised as far as practical, thereby maximizing the effective treatment surface area of the elevated swale 1, which results in maximized efficacy of the structure for contaminant removal. The height of the weir 35 may optionally be adjusted by adding or removing conventional plates (also known as "stop logs") 36 in order to cause the water level 31 within the elevated swale 1 to be located near the top surface of the elevated swale for a particular flow rate. A secondary purpose of the weir 35 is to provide a means for measuring flow rates through the elevated swale 1 by the use of conventional flow measurement procedures such as weir stage-discharge equations.

FIG. 12 is a longitudinal cross-sectional view of the present invention with an optional prefilter screen 37. The prefilter screen 37 is located at the upstream face of the elevated swale 1. The purpose of the prefilter screen 37 is to trap a portion of the suspended solid particles, thereby preventing them from plugging the interior zone 3 of the elevated swale 1. The prefilter screen 37 is preferably constructed so as to be easily removed for cleaning and reinstallation or replacement. The prefilter screen 37 may be comprised of any suitably rigid, durable and permeable material. Examples of suitable materials include nonwoven polymer mechanical filter media and woven cloth filter fabric with a suitable support frame.

FIG. 13 is a transverse cross-sectional view of the present invention with an optional plant-resistant barrier layer 38 surrounding the roots of plants 10. The purpose of the plant-resistant barrier layer 38 is to prevent the penetration of plant roots and stems into and out of the elevated swale 1. The plant-resistant barrier layer 38 may be comprised of any suitable material that is permeable to water and impenetrable by growing plants. One example of a suitable material is commercially available weed-proof landscaping fabric.

The plant-resistant barrier layer 38 may be employed in connection with the first embodiment of the present invention by installing the barrier either between the interior section and the exterior shell or outside of the exterior shell. The plant-resistant barrier layer 38 may be employed in connection with the second embodiment of the present invention by installing the barrier either between or outside of the stacked layers of matting (not shown).

FIG. 13 also shows an optional top layer of plant growth medium 39 that may be installed on the elevated swale 1 for the purpose of enhancing the growth of plants 10 that are planted on the elevated swale 1. Growth medium 39 may be either soil-based, such as potting soil and bedding soil, or soil-less, such as peat-based and polymer foam-based mixtures.

Additionally, FIG. 13 shows an alternative embodiment of the present invention in which the cylindrical cavities 11 are filled with a hydrophilic wicking medium 40. The wicking medium 40 draws water upward by capillary force from the internal flowing water level 31 to the layer of soil-less growth medium 39, where it is more readily available to the plants 10. As shown, with the present invention, the plants 10 are able to grow within the elevated swale 1 without extending into the ground subsurface 23; by contrast, the plant roots of conventional treatment swales must extend into the ground subsurface 23 in order to obtain adequate water. The hydrophilic wicking medium 40 may be comprised of rockwool, peat and/or BIOMIX™. BIOMIX™ is manufactured by Floating Island International, LLC of Shepherd, Mont. and is a blend of peat, open-cell polymer foam, worm castings, pumice sand and powdered bark. This product has four major functions: (1) it wicks water upward to support the growth of terrestrial plants located on or near the top of the elevated swale; (2) it reduces the volume of stormwater flow in the channel by promoting rapid evapotranspiration (via wicking and evaporation from the top surface of the elevated swale) and via plant uptake; (3) it provides a damp but unsaturated environment for plant roots that provides aeration as well as moisture; and (4) it provides required macro and micro nutrients for rapid growth of new plants. In addition to use as a wicking medium 35, BIOMIX™ may be used as a soil-less growth medium 39.

Figure 14:
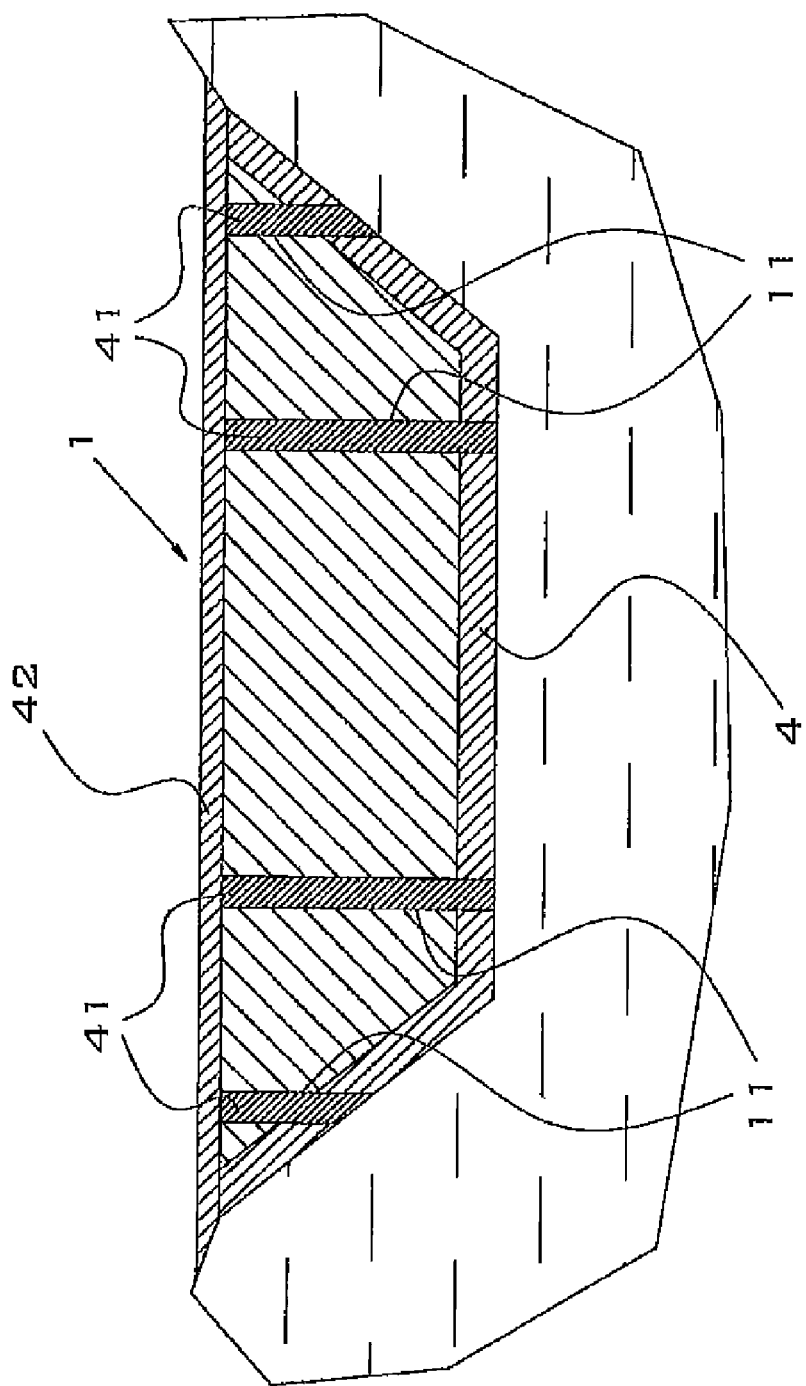
FIG. 14 is a transverse cross-sectional view of the present invention with optional load-bearing support columns and an optional top cover.

FIG. 14 is a transverse cross-sectional view of the present invention with optional load-bearing support columns and an optional top cover. In this embodiment, the cylindrical cavities 11 are filled with uncured cement slurry that cures in place to form support columns 41 for the elevated swale 1. The top cover 42 may be used to support loads from foot traffic or vehicles; alternately, the top cover 42 may be used to contain noxious odors, prevent unwanted plant growth, and/or provide protection for the underlying components of the elevated swale 1 from degradation by ultraviolet sunlight. Suitable materials for the top cover 42 include, but are not limited to, polymer decking boards, plywood, or polymer sheeting.

Other suitable filler materials (not shown) that may be placed within the cylindrical cavities 11 include soil, sand, gravel, or a combination of sand and gravel. These materials add weight to the elevated swale 1, thereby increasing the stability of the elevated swale 1 against movement due to high stormwater flows. These materials may also provide additional surface for colonization by beneficial bacteria, as well as providing a good medium for the establishment of plant roots. When fine-grained particles are utilized, the cavities may optionally be lined with materials (not shown) that are water-permeable but impenetrable by the fine particles, thereby retaining the particles within the aperture. Examples of suitable liner materials include woven and nonwoven landscaping filter material.

The advantages of the present invention are numerous. One of the advantages of the present invention is that the entire stream flow (under normal conditions) passes through the matrix material; therefore, the entire normal ditch flow is constantly exposed to mechanical and biological filtration. Flood flows can flow over the top surface, thereby preventing backwater flooding.

Yet another advantage of the present invention is that mosquitoes are prevented form reaching the water surface, which is contained within the permeable matrix; therefore, mosquito breeding is inhibited. A further advantage is that humans and domestic animals are prevented from contacting the water; therefore, exposure to biological and chemical contaminants in the water is reduced.

Yet another advantage of the present invention is that the elevated swale can optionally be built to support a top load such as a walkway or road; i.e., it can serve as a bridge (as shown in FIG. 14). A further advantage is that the elevated swale can comprise an optional low-permeability top cover to reduce noxious water odors.

Yet another advantage of the present invention is that the shape of the elevated swale can be custom-built to fit the contour of any ditch, thereby preventing channeling of water around the filter. A further advantage is that the elevated swale is made of semi-rigid and slightly compressible material, which allows the outer surfaces of the filter to compress as required to fit irregular local contours of any ditch.

Yet another advantage of the present invention is that the elevated swale can optionally be fitted with an easily cleanable prefilter screen to trap debris such as leaves and trash. A further advantage is that installation of the elevated swale does not require reshaping of the existing ditch profile.

Yet another advantage of the present invention is that the elevated swales can be installed within channels having very steep (or even vertical) side walls. Prior art swales must be installed in channels having side walls with relatively gentle slopes in order to establish vegetation because seeds and bedding plants will generally be blown away by wind or washed away by storm flows before they can become rooted into streambank soils when placed on slopes steeper than about 2:1 (horizontal:vertical). Because steep-walled channels require less surface area than gentle-walled channels to carry the same flows, valuable surface area can be saved for other purposes if the present invention is installed in lieu of prior art swales. A further advantage is that the elevated swale can be optionally fitted with a layer of weed matting to prevent plants from growing into or out of the sides and bottom of the filter.

Yet another advantage of the present invention is that plants can be selectively established and grown on the elevated swale; soil-less growth medium may optionally be used to support plant growth. The plants may optionally be irrigated to promote growth of roots down to waterline within the matrix. A further advantage is that used sections of elevated swale may be removed and resold as erosion control material. This feature may be particularly appropriate when the material contains mature plants.

Yet another advantage of the present invention is that the elevated swale may be comprised of recycled scrap material. A further advantage is that the elevated swale may optionally be fitted with an ultraviolet-resistant top cover.

Yet another advantage of the present invention is that during very high flow events, water can overtop the elevated swale without causing damage. In addition, the presence of the elevated swale protects the underlying channel bed from being eroded by high flows. By contrast, conventional bioswales are more likely to become damaged or dislodged by high flows. A further advantage is that the elevated swales can effectively treat contaminated groundwater when they are retrofitted into existing concrete-lined channels. By contrast, conventional bioswales will not function in concrete-lined channels because their plants cannot thrive within an impermeable (concrete) substrate.

Yet another advantage of the present invention is that the porosity (percentage of pore space) within the elevated swale is about ninety-five percent (95%) prior to plant growth, compared to porosities in the range of about twenty percent (20%) to forty percent (40%) for conventional granular materials utilized in the construction of wet swales. The additional pore space of the present invention provides a larger surface area for biofiltration and is resistant to plugging by trapped particulates.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:
1. An elevated swale comprising:
(a) a porous and water-permeable interior zone;
(b) a permeable and compressible exterior shell; and
(c) vertically oriented inserts;
wherein the exterior shell surrounds the interior zone; and
wherein the inserts are placed within cylindrical cavities that are cut vertically into the interior zone.
2. The elevated swale of claim 1, wherein plants are grown within the inserts.
3. The elevated swale of claim 2, wherein the inserts comprise bedding soil and/or soil-less growth medium.
4. The elevated swale of claim 1, wherein the interior zone is colonized by microbial biofilms.
5. The elevated swale of claim 1, wherein the interior zone is comprised of pieces of nonwoven polymer matting that have been compressed into a semi-rigid permeable block.
6. The elevated swale of claim 5, wherein the nonwoven polymer matting is biological filter medium comprised of recycled polyethylene terephthalate fibers that are intertwined.
7. The elevated swale of claim 6, wherein the fibers have a mass-to-length ratio in the range of about 50 denier to about 300 denier.
8. The elevated swale of claim 6, wherein the fibers are reinforced with an adhesive binder.
9. The elevated swale of claim 1, wherein the interior zone is comprised of loose polymer fibers that have been compressed into a semi-rigid permeable block.
10. The elevated swale of claim 1, wherein the fibers are recycled scrap carpet fibers selected from the group consisting of polypropylene fibers, polyethylene fibers, polyethylene terephthalate fibers, and nylon fibers.
11. The elevated swale of claim 1, wherein the exterior shell has an uncompressed thickness of about 0.5 inch to six inches.
12. The elevated swale of claim 1, wherein the elevated swale has a top, bottom and sides, and the cylindrical cavities extend vertically from the top of the elevated swale to the bottom or sides of the elevated swale.
13. The elevated swale of claim 1, wherein the exterior shell is comprised of nonwoven matting comprised of recycled polyethylene terephthalate fibers that are intertwined.
14. The elevated swale of claim 13, wherein the fibers have a mass-to-length ratio in the range of about 100 denier to about 600 denier.

15. The elevated swale of claim 13, wherein the fibers are reinforced with an adhesive binder.

16. The elevated swale of claim 1, wherein the exterior shell is comprised of nonwoven polymer matting comprised of fibers having a mass-to-length ratio in the range of about 50 denier to about 99 denier.

17. The elevated swale of claim 1, wherein the exterior shell is comprised of open-cell polyurethane foam sheeting.

18. The elevated swale of claim 1, wherein the elevated swale is installed in a channel that has sides and a bottom;
wherein the elevated swale has sides and a bottom;
wherein the bottom of the elevated swale is in contact with the bottom of the channel, and the sides of the elevated swale are in contact with the sides of the channel; and
wherein the permeable exterior shell on the bottom and sides of the elevated swale is replaced with an impermeable foam rubber sheeting.

19. The elevated swale of claim 1, further comprising a permeable polymer mesh containment bag;
wherein the exterior shell comprises a top, and the top of the exterior shell is omitted; and
wherein the permeable polymer mesh containment bag contains the interior zone within the exterior shell, thereby allowing the interior zone to be removed from the exterior shell for cleaning and/or replacement of the interior zone.

20. The elevated swale of claim 1, further comprising a plant-resistant barrier that is located between the interior zone and the exterior shell.

21. The elevated swale of claim 1, wherein the exterior shell comprises an outside surface, and a plant-resistant barrier is located on the outside surface of the exterior shell.

22. An elevated swale comprising:
(a) stacked layers of polymer matting; and
(b) vertically oriented inserts;
wherein the cylindrical inserts are placed within cavities that are cut vertically into the stacked layers of polymer matting.

23. The elevated swale of claim 22, wherein the inserts comprise bedding soil and/or soil-less growth medium.

24. The elevated swale of claim 22, wherein each layer of polymer matting is nonwoven polymer matting that is roughly two inches thick.

25. The elevated swale of claim 22, wherein each layer of polymer matting comprises recycled scrap carpet materials that are formed into blankets of nonwoven matting.

26. The elevated swale of claim 22, wherein the layers of matting are bound together by an adhesive.

27. The elevated swale of claim 22, wherein the layers of matting are bound together by stitching.

28. The elevated swale of claim 22, wherein the layers of matting are bound together by pinning.

29. The elevated swale of claim 22, further comprising a plant-resistant barrier that is located between any two layers of polymer matting.

30. The elevated swale of claim 22, wherein the stacked layers of polymer matting together form an outside surface, and a plant-resistant barrier is located on the outside surface of the stacked layers of polymer matting.

31. The elevated swale of claim 1 or 22, wherein said inserts comprise anchoring spikes that are passed through the cavities and driven into ground subsurface, thereby anchoring the elevated swale.

32. The elevated swale of claim 1 or 22, wherein the elevated swale has a downstream face, and an underflow gate is attached to the downstream face of the elevated swale.

33. The elevated swale of claim 1 or 22, wherein the elevated swale has a downstream face, and a weir is attached to the downstream face of the elevated swale.

34. The elevated swale of claim 1 or 22, wherein the elevated swale has an upstream face, and a prefilter screen is attached to the upstream face of the elevated swale.

35. The elevated swale of claim 1 or 22, further comprising a top layer of plant growth medium.

36. The elevated swale of claim 1 or 22, wherein said inserts comprise a hydrophilic wicking medium that is inserted into the cavities.

37. The elevated swale of claim 1 or 22, further comprising a top cover and support columns;
wherein the support columns comprise the inserts.

38. The elevated swale of claim 37, wherein the top cover is comprised of a material selected from the group consisting of polymer decking boards, plywood and polymer sheeting.

39. The elevated swale of claim 37, wherein the support columns are comprised of cement.

40. The elevated swale of claim 1 or 22, wherein the inserts comprise a substance selected from the group consisting of soil, sand and gravel.

41. The elevated swale of claim 40, wherein the cavities are lined with a material that is permeable to water but impermeable to fine particles.

* * * * *